(12) United States Patent
Thadasina et al.

(10) Patent No.: US 8,423,032 B2
(45) Date of Patent: Apr. 16, 2013

(54) APPARATUS AND METHOD FOR SERVING CELLSITE SELECTION

(75) Inventors: Nivedan Thadasina, Allen, TX (US); Vijayasimman Rajasimman, Plano, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 266 days.

(21) Appl. No.: 12/878,516

(22) Filed: Sep. 9, 2010

(65) Prior Publication Data

US 2012/0064900 A1 Mar. 15, 2012

(51) Int. Cl.
*H04W 40/00* (2009.01)

(52) U.S. Cl.
USPC ............... 455/446; 455/435.2; 455/444

(58) Field of Classification Search ............... 455/466, 455/524, 525, 151.1, 154.1, 404, 404.1, 404.2, 455/67.11, 115.1, 446, 444, 435.2
See application file for complete search history.

(56) References Cited

U.S. PATENT DOCUMENTS

| | | | | |
|---|---|---|---|---|
| 7,577,443 | B1 * | 8/2009 | Moll et al. | 455/456.1 |
| 8,185,088 | B2 * | 5/2012 | Klein et al. | 455/409 |
| 2009/0061892 | A1 * | 3/2009 | Lee et al. | 455/456.1 |
| 2009/0092080 | A1 * | 4/2009 | Balasubramanian et al. | 370/328 |
| 2009/0253421 | A1 * | 10/2009 | Camp et al. | 455/418 |
| 2011/0087887 | A1 * | 4/2011 | Luft et al. | 713/178 |
| 2012/0088505 | A1 * | 4/2012 | Toh et al. | 455/434 |

* cited by examiner

*Primary Examiner* — Cong Tran

(57) ABSTRACT

A method and apparatus use existing datafill information from macrocells to turn-up the cell site. A cell site includes a global position positioning system (GPS) receiver configured to determine a current location of the cell site. A transceiver subsystem in the cell site manages a wireless communication interface, and a controller, coupled to the GPS receiver and the transceiver subsystem. The controller is configured to send the current location of the cell site to a cell site manager, receive cell site identification data for existing macrocells and virtual macrocells from the cell site manager, and selects candidate macrocells based on a selection algorithm until one is validated by the switching center. Datafill information associated with the validated macrocell to create datafill entries for the cell site.

20 Claims, 7 Drawing Sheets

APPARATUS AND METHOD FOR SERVING CELLSITE SELECTION

TECHNICAL FIELD OF THE INVENTION

The present application relates generally to an improved method and apparatus for turning up a cell site and, more specifically, to a cell site that uses existing datafill information from macrocells to autonomously turn-up the cell site.

BACKGROUND OF THE INVENTION

When turning-up (i.e. configuring) a new cell site, the existing methods require a wireless operator to datafill every new cell site in the wireless switching center (WSC), e.g. mobile switching center (MSC), even though the new cell site underlays or coexists with an already-established macrocell site.

The process begins with defining where the new cell site is geographically located and looking at the new cell site relative to other cell sites for the purpose of interference management. In terms of coverage the location of the cell site is identified in terms of latitude/longitude to determine whether the cell site is at a particular location (e.g. structure, road, neighborhood) and whether there are some actions or translations that must be defined. Based on all this information, the wireless operator must figure out what steps need to be taken in order to datafill all the configuration data and establish the cell site for that particular location.

In addition, the wireless operator needs to get regulatory compliance. For example, the wireless operator must identify the appropriate Public Safety Answering Point (PSAP) for the location of each new cell site in order to properly route emergency 911 calls. In order for that PSAP to accept or recognize the cell site, one must go through some paperwork to request authorization. Datafill of the new cell site in the WSC involves, but is not limited to, market-specific translations data, dialup setup, emergency 911 (E911) PSAP route selection and configuration, and configuration for complying with telecommunications laws and standards (e.g. Communications Assistance for Law Enforcement Act (CALEA).

Once the data is entered, the wireless operator will have to spend several resources to test and certify to ensure there are no errors. Accuracy of this data in the WSC is essential because the subscriber calls are routed based on this data. This is a tremendous burden on the operator as the entire process can take anywhere from several days to weeks. With the advent of miniature cell sites, such as microcells, picocells, femtocells, and cell sites on wheels (COWs), the current method of turning up new cell sites in the WSC is disadvantageous as it is not only a slow and labor intensive process, but also slows down cell site turn-up.

Therefore, there is a need in the art for an improved method and apparatus for turning up cell sites more quickly. In particular, there is a need for a method and apparatus that uses existing datafill information from macrocells to autonomously turn-up the cell site.

SUMMARY OF THE INVENTION

To address the above-discussed deficiencies of the prior art, it is a primary object to provide, for use in a cell site, a method and apparatus that uses existing datafill information from macrocells to autonomously turn-up the cell site.

In one embodiment, a method for use in a cell site to perform turn-up of the cell site in a wireless network is provided. The method includes sending a current location of the cell site to a cell site manager and receiving cell site identification data for each of a set of macrocells from the cell site manager. A valid macrocell from the set of existing macrocells is selected, such that the cell site identification data of the valid macrocell can be used by a switching center to determine datafill information for the cell site.

In another embodiment, a cell site configured to perform autonomous turn-up in a wireless network is provided. The cell site includes a global position positioning system (GPS) receiver configured to determine a current location of the cell site. A transceiver subsystem is configured to manage a wireless communication interface. A controller, coupled to the GPS receiver and the transceiver subsystem, is configured to send the current location of the cell site to a cell site manager, receive cell site identification data for each of a set of macrocells from the cell site manager, select a valid macrocell from the existing macrocells, such that the cell site identification data of the valid macrocell can be used by a switching center to determine datafill information for the cell site.

In yet another embodiment, a method of providing datafill information for performing a turn-up of a cell site is provided. The method includes receiving a current location of the cell site. A configuration data for the cell site is generated based on the current location of the cell site. The configuration data is transmitted to the cell site, and an indicator for the cell site is set to an online status in response to receiving a confirmation of successful turn-up from the cell site.

In yet another embodiment, a method for use in a switching center during a turn-up of a cell site is provided. The method includes receiving cell site identification data of a candidate macrocell from the cell site. If the candidate macrocell is valid, at least one datafill entry is created for the cell site based on stored datafill information associated with the candidate macrocell.

In some embodiments, virtual macrocells are created and assigned based on geographic localities (e.g. counties, cities, and such). When no valid existing macrocells are available to reuse the datafill information, the cell site information associated with the virtual macrocell assigned to the same locality as the femtocell is used to turn up the femtocell.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
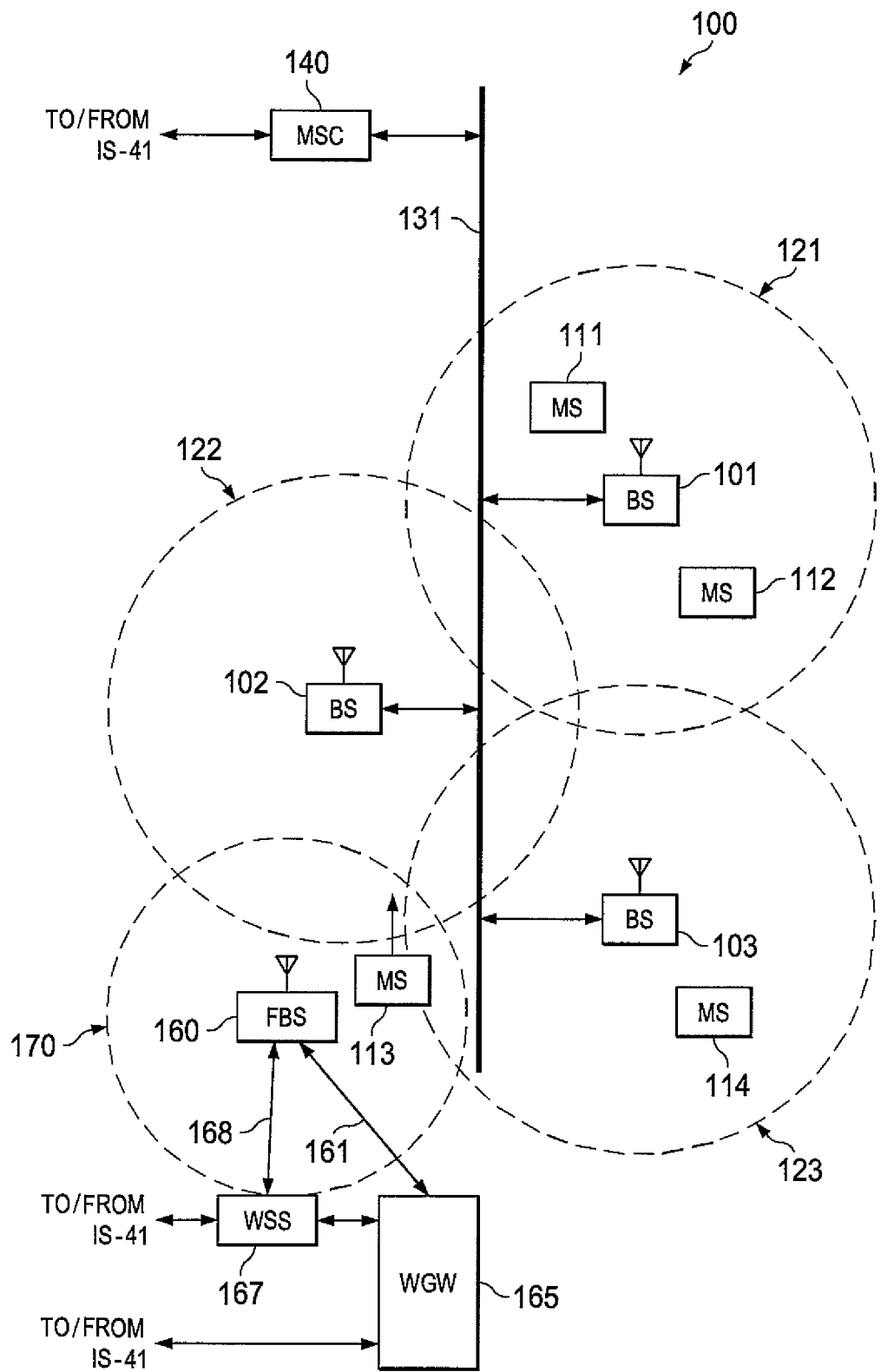
FIG. 1 illustrates a wireless network according to the principles of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the term "wireless switching center" is another term for "wireless soft switch" used below. Further, the term "macrocell" can represent a "base station," "macrocell site," or a "sector" belonging to a "base station". In the present disclosure, "cell site," and "base station" are used interchangeably to indicate the actual transmission units (may be "sector" or "base station" and the like) in the wireless system. Also, the LTE term "user equipment" or "UE" is another term for "subscriber station" or "mobile station" used below. It is noted that in all the following figures, some optional features are explicitly marked while some are omitted for clarity purpose.

With regard to the following description, it is also noted that the term "miniature cell site" represents a "small base station" that uses low power to serve a limited number of mobile stations in a limited coverage area. Some examples of "miniature cell site" are, but not limited to, "microcell," "picocell," "femtocell," and a "cell site on wheels (COW)". Embodiments and figures in the present disclosure may be described using femtocells in place of miniature cell sites. However, this is merely for descriptive purposes and is not meant to limit the present disclosure to femtocells as each femtocell in the described embodiments can be replaced by any other miniature cell site.

As described in IEEE 802.16m System Requirements, a femtocell is a low power Base Station (BS). In the present disclosure "femtocell" may be used interchangeably with "femto base station" and "femtocell base station." Femtocells are typically installed by a subscriber in a home or small office/home office to provide access to closed or open group of users as configured by the subscriber and/or the access provider. Femtocells typically operate in licensed spectrum and may use the same or different frequency as macrocells and use broadband connection such as cable or DSL for backhaul. The mobile station (MS)'s using access in a femtocell are typically stationary or moving at low (i.e., pedestrian) speed.

The present disclosure is to improve the turn-up process of small-sized low-power base stations that underlays or coexists with larger base stations such as macro, which may overlay the low-power small-sized base stations. While the currently used method takes anywhere from several days to weeks to datafill a new cell site in the wireless switching center, the embodiments described in the present disclosure will reduce the total datafill time to a few seconds.

Throughout the application, femtocell is used as an example of the low-power small-sized base stations, and macrocell is used as an example of the large-sized base stations which may overlay the smaller base stations. All the embodiments are applicable to any type or size of the base stations in multi-tier networks, where some larger cell may overlay some smaller cells.

Low-power small-sized cells, such as femtocells, are different from larger cells, such as macro cells. The multi-tier network, with base stations of various types and sizes, may have the capability to identify femtocells as well as to distinguish femtocells from macrocells. Further, the multi-tier network may have the capability to distinguish open-access femtocell (which allow any compatible MS to access) from the Closed Subscriber Group (CSG) femtocell (which allows only authorized MS's, i.e., the MS's belonging to this femtocell, to access), since some operations, such as, but not limited to, handover, paging, and the like, will be different for femtocells and macrocells, and for open-access and CSG femtocells.

FIG. 1 illustrates a wireless network according to the principles of the present disclosure. The embodiment of wireless network 100 illustrated in FIG. 1 is for illustration only. Other embodiments of the wireless network 100 could be used without departing from the scope of this disclosure.

Wireless network 100 comprises a plurality of cells 121-123, each containing one of the base stations, BS 101, BS 102, or BS 103. Base stations 101-103 communicate with a plurality of mobile stations (MS) 111-114 using one of many wireless telecommunications standards (e.g. Universal Mobile Telecommunications System (UMTS), Worldwide Interoperability for Microwave Access (WiMAX), Long Term Evolution (LTE), and such. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

Dotted lines show the approximate boundaries of cells 121-123 in which base stations 101-103 are located. The cells are shown approximately circular for the purposes of illustration and explanation only. It should be clearly understood that the cells may have other irregular shapes, depending on the cell configuration selected and natural and man-made obstructions.

As is well known in the art, each of cells 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present disclosure is not limited to any particular cell configuration.

In some embodiments, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown), or any IS-41 communication network as is known in the art, via communication line 131 and mobile switching center (MSC) 140. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the IS-41, PSTN, or Internet. MSC 140 is well known to those skilled in the art. In some embodiments of the present disclosure, communications line 131 may be several different data links where each data link couples one of BS 101, BS 102, or BS 103 to MSC 140.

The wireless network 100 includes a femtocell base station (FBS) 160. FBS 160 includes components analogous to those found in macro base stations BS 101, BS 102 and BS 103. As such, FBS 160 comprises a femto base station controller (FBSC) and one or more femto base transceiver subsystem(s) (FBTS). FBS 160 communicates with mobile stations in its served area using IS-95, CDMA or any other cellular communications standard.

Voice bearer traffic is transferred between the FBS 160 and the IS-41 network (e.g., PSTN) via communication line 161, Wireless Gateway (WGW) 165. Signaling/control traffic is transferred between the FBS 160 and the IS-41 network via communication line 168 and Wireless Soft Switch (WSS) 167. The WGW 165 and WSS 167 are coupled via a backhaul connection (not shown), e.g., the IS-41, to the MSC 140. The WGW 165 provides a bearer path between FBS 160 and MSC 140 via the IS-41. The WSS 167 provides a signaling path to the FBS 160 and WGW 165 as well as to the MSC 140 via the IS-41.

A dotted line shows the approximate boundary of a cell 170 (e.g., coverage area) in which FBS 160 is located. The cell is shown approximately circular for the purposes of illustration and explanation only. It should be clearly understood that the cell may have an irregular shape, depending on the cell configuration selected and natural and man-made obstructions.

Figure 2:
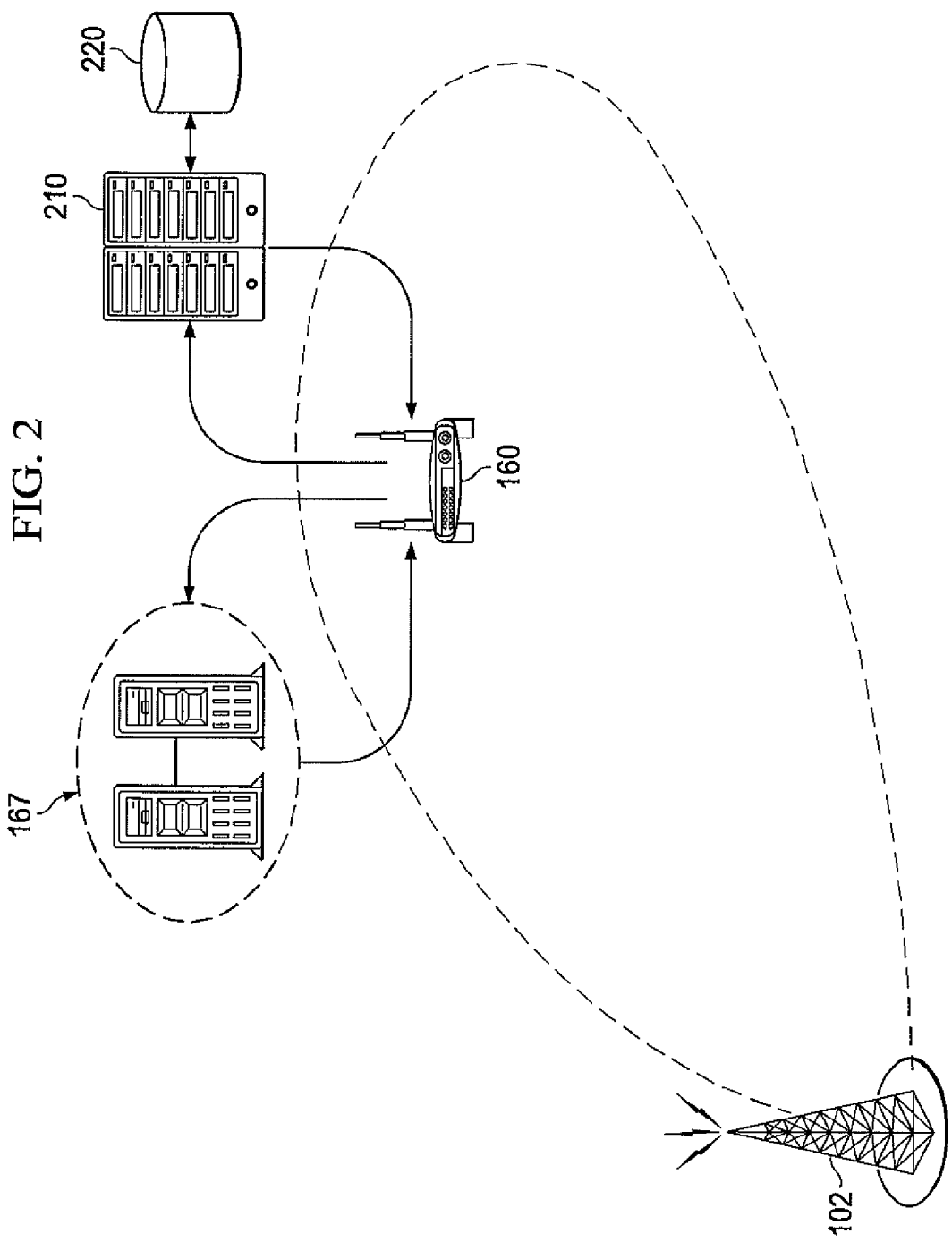
FIG. 2 illustrates a serving macrocell site network topology according to embodiments of the present disclosure.

FIG. 2 illustrates a serving macrocell site network topology according to embodiments of the present disclosure. As mentioned earlier, the present disclosure is directed to improving the turn-up process for miniature cell sites, such as femtocell 160 that underlay or coexist with larger base stations such as macrocell. The cell site manager 210 is a server configured to manage cell sites such as femtocell 160 and base stations 101-103 (i.e. macrocells). The cell site manager 210 communicates with a macrocell database 220. Alternatively, macrocell database 220 may be included in the cell site manager 210. Macrocell database 220 contains site data for the entire market served by a wireless operator.

During turn-up, femtocell 160 uses various methods to communicate with the cell site manager 210, such as Simple Network Management Protocol (SNMP). With assistance from the cell site manager 210 and a specific method to be described later, femtocell 160 will process information to identify the best macrocell, such as BS 102. The selection is then communicated wirelessly or by cable to the wireless switching center (i.e. WSS 167). The femtocell 160 may communicate with WSS 167 through wired or wireless interface using various communication protocols such as, but not limited to session initiation protocol (SIP). The WSS 167 reuses the datafill information associated with the selected macrocell upon successfully completing a data integrity check of the selected macrocell.

As mentioned earlier, datafill information includes market specific translations data, dialup setup, E911 PSAP route selection and configuration, and such information that is useful for routing voice and Short Message Service (SMS) text messages, as well as other services (such as conference calls, fax and circuit switched data) for mobile stations that are being served by the femtocell 160.

For example, a radio station in Dallas, Tex., may hold a contest that requires participants to call or send a text message to a particular number, e.g. '#78'. When a participant in Dallas dials the number, the call is automatically routed to the radio station. However, when a person in Chicago, Ill., dials the same number, the call does not get routed to the radio station in Dallas, Tex., because the macrocells in Dallas, Tex., and New York City do not share the same market specific translations data. That is, based on a mobile station's location, the behavior or where calls get routed is specific to the market. This is the same for E911 numbers in that emergency calls must be routed to the nearest E911 PSAP. Common numbers such as toll-free numbers may also work in this way. All this information is stored in the WSS 167.

Figure 3:
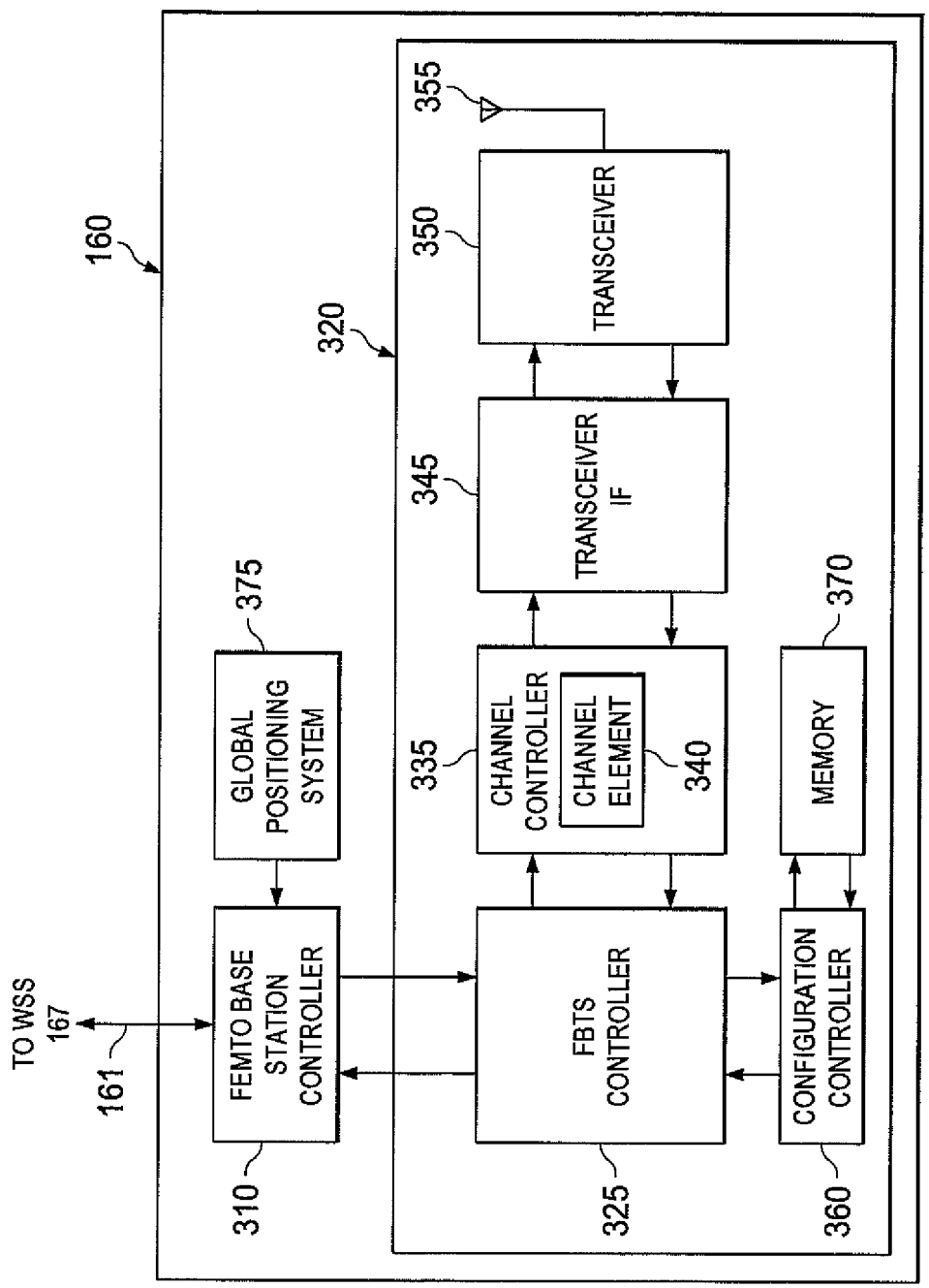
FIG. 3 illustrates a miniature base station according to an embodiment of the present disclosure.

FIG. 3 illustrates the femtocell 160 according to an embodiment of the present disclosure. The embodiment of femtocell 160 illustrated in FIG. 3 is for illustrative purposes only as a representative of miniature base stations. Other miniature base stations could be used without departing from the scope of this disclosure.

Femtocell 160 comprises a femto base station controller (FBSC) 310 and femto base transceiver subsystem (FBTS) 320. A femto base station controller is a device that manages wireless communications resources, including the femto base transceiver subsystems, for specified cells within a wireless communications network. A femto base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the femto base transceiver subsystem 320 in femtocell 160 and the femto base station controller 310 associated with the femto base transceiver subsystem 320 are collectively represented by femtocell 160.

FBSC 310 manages the resources in femtocell 160, including FBTS 320, manages backhaul communications with WSS 167 and cell site manager 210, and controls the overall turn-up process in the femtocell 160. During turn-up of the femtocell 160, FBSC 310 is configured to send the current location to the cell site manager 210, receive a list of macrocells from the cell site manager 210, and perform the method for selecting the best candidate macrocells from which the datafill information can be used by the WSS 167 to establish data entries for the cell site.

FBTS 320 comprises FBTS controller 325, channel controller 335, transceiver interface (IF) 345, RF transceiver unit 350, and antenna array 355. Channel controller 335 comprises a plurality of channel elements, including channel element 340. FBTS 320 also comprises a configuration controller 360. The embodiment of configuration controller 360 and memory 370 included within FBTS 320 is for illustration only. Configuration controller 360 and memory 370 can be located in other portions of FBS 160.

FBTS controller 325 comprises processing circuitry and memory capable of executing an operating program that communicates with FBSC 310 and controls the overall operation of FBTS 320. Under normal conditions, FBTS controller 325 directs the operation of channel controller 335, which contains a number of channel elements, including channel element 340, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). Transceiver IF 345 transfers the bi-directional channel signals between channel controller 340 and RF transceiver unit 350. The embodiment of RF transceiver unit 350 as a single device is for illustration only. RF transceiver unit 350 can have separate transmitter and receiver devices without departing from the scope of this disclosure.

Antenna array 355 transmits forward channel signals received from RF transceiver unit 350 to mobile stations in the coverage area 170 of femtocell 160. Antenna array 355 also sends to transceiver 350 reverse channel signals received from mobile stations in the coverage area 170 of BS 160. In some embodiments of the present disclosure, antenna array 355 is a multi-sector antenna, such as a three-sector antenna in which each antenna sector is responsible for transmitting and receiving in a '120' degree arc of coverage area. Additionally, RF transceiver 350 may contain an antenna selection unit to select among different antennas in antenna array 355 during transmit and receive operations.

According to some embodiments of the present disclosure, FBTS controller 325 is operable to execute programs, such as an operating system (OS) and processes for resource allocations, stored in a memory 370. Memory 370 can be any computer readable storage medium, for example, the memory 370 can be any electronic, magnetic, electromagnetic, optical, electro-optical, electro-mechanical, and/or other physical device that can contain, store, communicate, or transmit a computer program, software, firmware, or data for use by the microprocessor or other computer-related system or method. Memory 370 comprises a random access memory (RAM) and another part of memory 370 comprises a Flash memory, which acts as a read-only memory (ROM).

Femtocell 160 also includes a Global Positioning System (GPS) receiver 375. The GPS receiver 375 is configured to determine a geographical position of femtocell 160 and timing information. GPS satellites broadcast signals from space that are picked up and identified by the GPS receiver 375. The GPS receiver 375 then calculates and provides three-dimensional geographical location (latitude, longitude, and altitude) information plus the time. The FBSC 310 can be configured to transmit the geographical position obtained from the GPS receiver 375.

Figure 4:
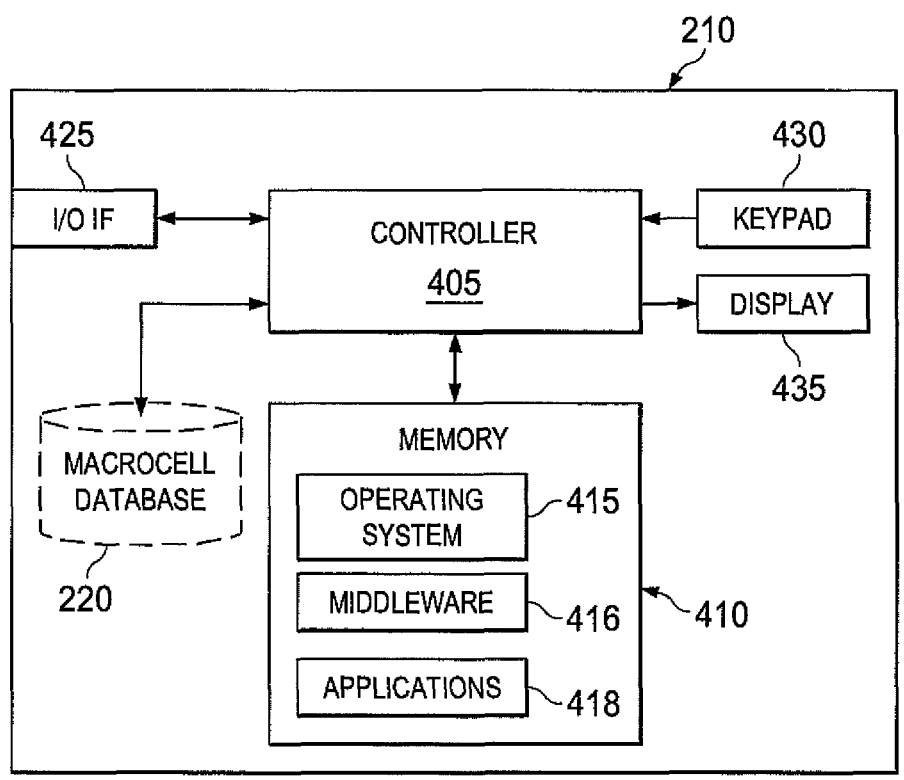
FIG. 4 illustrates a cell site manager according to an embodiment of the present disclosure.

FIG. 4 illustrates the cell site manager 210 according to an embodiment of the present disclosure. The embodiment of the cell site manager 210 shown in FIG. 4 is for illustration only. Other embodiments could be used without departing from the scope of this disclosure.

As mentioned earlier, the cell site manager 210 is a server configured to manage cell sites such as femtocell 160 and base stations 101-103 (i.e. macrocells). The cell site manager 210 can be a stand-alone device. The cell site manager 210 includes a controller 405, which can also be a microprocessor, a microcontroller, an application-specific integrated circuit (ASIC), field programmable gate array (FPGA), and such. The controller 405 can manage communications with a cell site, such as femtocell 160, during turn-up of the cell site. The cell site manager 210 also includes a memory 410.

Memory 410 can be any computer readable storage medium. For example, memory 410 can be any electronic, magnetic, electromagnetic, optical, electro-optical, electro-mechanical, and/or other physical device that can contain, store, communicate, or transmit a computer program, software, firmware, or data for use by controller 405 or other computer-related system or method. Portions of memory 410 can comprise a random access memory (RAM) and another part of memory 410 can comprise a Flash memory, which acts as a read-only memory (ROM).

The memory can store an operating system 415, middleware 416, and other applications 418. The operating system 415 can include one or more sets of instructions configured to be executed by controller 405 to perform one or more functions of the cell site manager 210. Memory 410 can also store middleware 416 and applications 418 for managing the registered cell sites, such as network operating control (NOC) and Operational Administration and Maintenance (OAAM). Additionally, cell site manager 210 may optionally include one or more databases such as macrocell database 220. Alternatively, macrocell database 220 can be external to the cell site manager 210 (as shown in FIG. 2), and cell site manager 210 may communicate with the external macrocell database 220 through the I/O interface 425.

Cell site manager 210 can include I/O interface 425, keypad 430 and display 435. The I/O interface 425, keypad 430 and display 435 can be coupled to controller 405 such that controller 405 is responsive to inputs from I/O interface 425 and keypad 430 and configured to control outputs to I/O interface 425 and display 435. In some embodiments, cell site manager 210 can communicate via the I/O interface 425 and a communication link, such as for example, an IS-41 link, to one or more femtocells, other cell site managers, or other networks.

Figure 5:
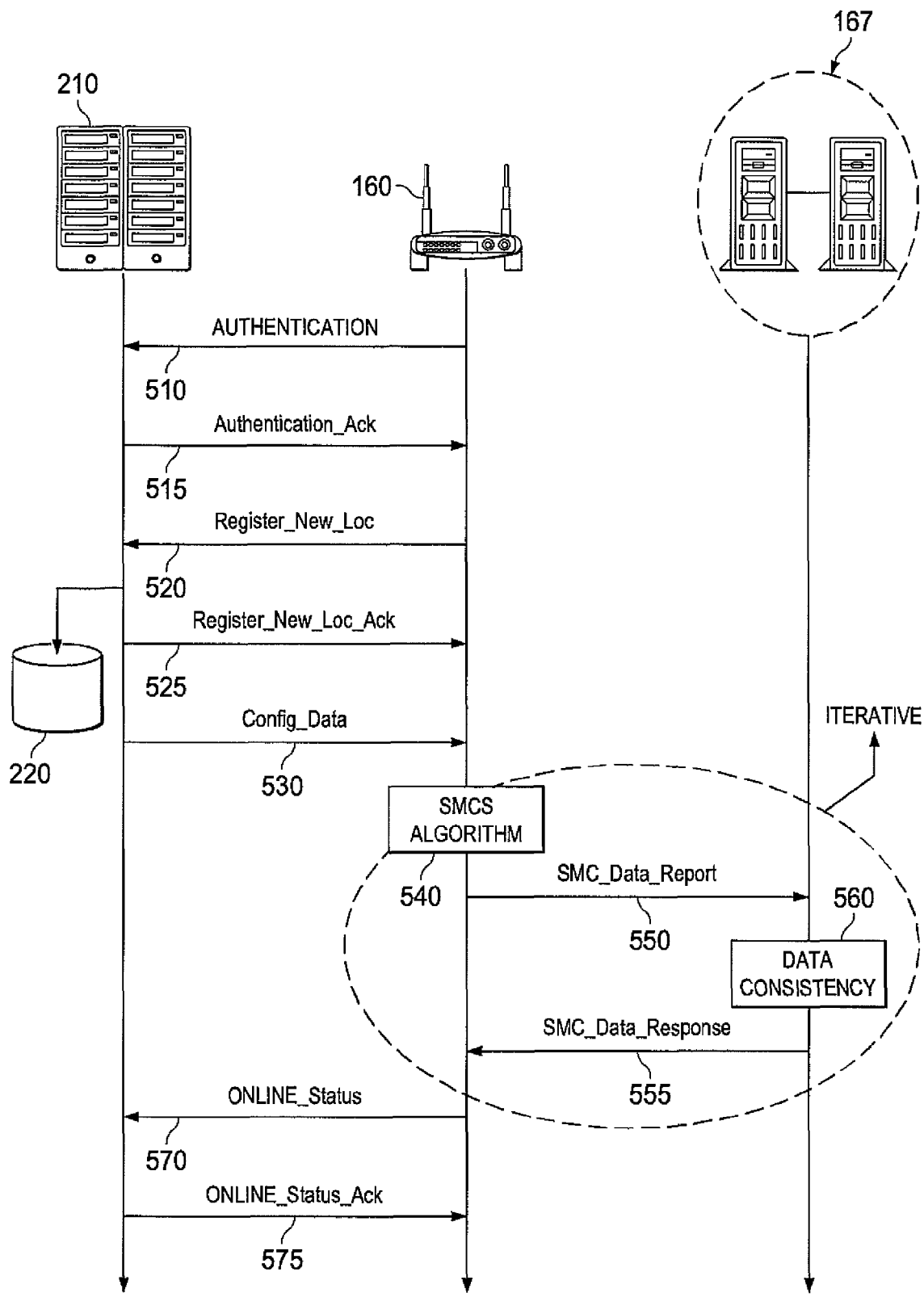
FIG. 5 illustrates a call flow of the cell site turn-up process in the macrocell site network according to an embodiment of the present disclosure.

FIG. 5 illustrates a call flow of the cell site turn-up in the macrocell site network according to an embodiment of the present disclosure. As mentioned previously, turning up (i.e. installing and configuring) a cell site requires datafill information to be entered for the cell site in the switching center (i.e. WSS 167). The call flow is described using femtocell 160 as the cell site being turned up. However, the call flow of FIG. 5 is not meant to be limited to femtocells, and any cell site can be configured to perform this process.

Upon power-up, the femtocell 160 communicates an authentication request 510 to the cell site manager 210. The cell site manager responds by sending an authentication acknowledgement 515 to the femtocell 160. Upon receiving the acknowledgement 515, the femtocell 160 determines its geographic location (e.g. latitude/longitude) using the GPS receiver 375, sends the location registration 520 to the cell site manager 210, and receives a location acknowledgement 525 from the cell site manager 210. Alternatively, the cell site manager 210 may explicitly request for the geographic conditions of the femtocell 160.

The cell site manager 210 uses the geographic location to dynamically build a configuration data. More specifically, the cell site manager queries the macrocell database 220 for a list of all the existing macrocells that are near the femtocell 160. The macrocell database 220 contains cell site data for all the existing macrocells. When the femtocell 160 reports its geographic position, the cell site manager 210 is able to automatically query the macrocell database 220 to build the configuration data that includes cell site data for all the macrocells in the county. In other embodiments, localities can be defined based on neighborhoods, subdivisions, cities, counties, regions, the entire market served by the wireless operator, and such. The configuration data may include, but is not limited to, a list of cell site identification data on the nearby existing macrocells. The configuration data 530 is downloaded by the femtocell 160.

In block 540, the femtocell 160 executes the Serving Macrocell Selection (SMCS) algorithm to select a set of candidate macrocells from which cell site data can be used for datafill. The best candidate macrocell is communicated to the WSS 167 in a Serving Macrocell (SMC) data report 550. In block 560, the WSS 167 performs a data consistency check on the candidate macrocell. If the data is validated, the WSS 167 uses the datafill information of the candidate macrocell to establish data entries for the femtocell 160 and sends a positive acknowledgement in an SMC data response 555 back to the femtocell 160. Receiving the positive acknowledgement serves as an indication that the cell site selection is accepted, and the femtocell 160 enables the RF power (i.e. femtocell 160 is turned up). The femtocell 160 then communicates an online status confirmation 570 to the cell site manager 210, which marks the femtocell 160 as ready-to-go and returns an acknowledgement 575 back to the femtocell 160. Alternatively, if the data is not validated, the WSS 167 sends a negative acknowledgement in the SMC data response 555 back to the femtocell 160. The femtocell determines and communicates the next best candidate macrocell to the WSS 167 in the SMC data report 550, and the WSS 167 performs the data consistency check in block 560 and sends the SMC data response 555. This iterative process repeats until either a candidate macrocell is validated or there are no more candidate macrocells left.

In some embodiments, at least one virtual macrocell is defined in the macrocell database and downloaded by the femtocell 160 along with the configuration data 530. A virtual macrocell is distinguished from an existing macrocell in the sense that cell site data for virtual macrocells does not correspond to a real macrocell. That is, virtual macrocells are defined to provide translations data in areas that are currently unserviced by existing macrocells. Consequently, the query by the cell site manager 210 for nearby macrocells may at least find a virtual macrocell even if there are no existing macrocells nearby. Virtual macrocells may be assigned at the county level. Virtual macrocells may also be assigned according to neighborhoods, subdivisions, cities, counties, or regions. In addition, virtual macrocells may be defined for each county. Alternatively, virtual macrocells may only be defined in counties or localities that are unserviced by existing macrocells. In one embodiment, a default virtual macrocell may be defined when no other existing or virtual macrocells are found. In another embodiment, if no macrocells or virtual macrocells are found based on the current location of the femtocell 160, the SMCS algorithm will select an existing macrocell from an adjacent county or locality.

Figure 6:
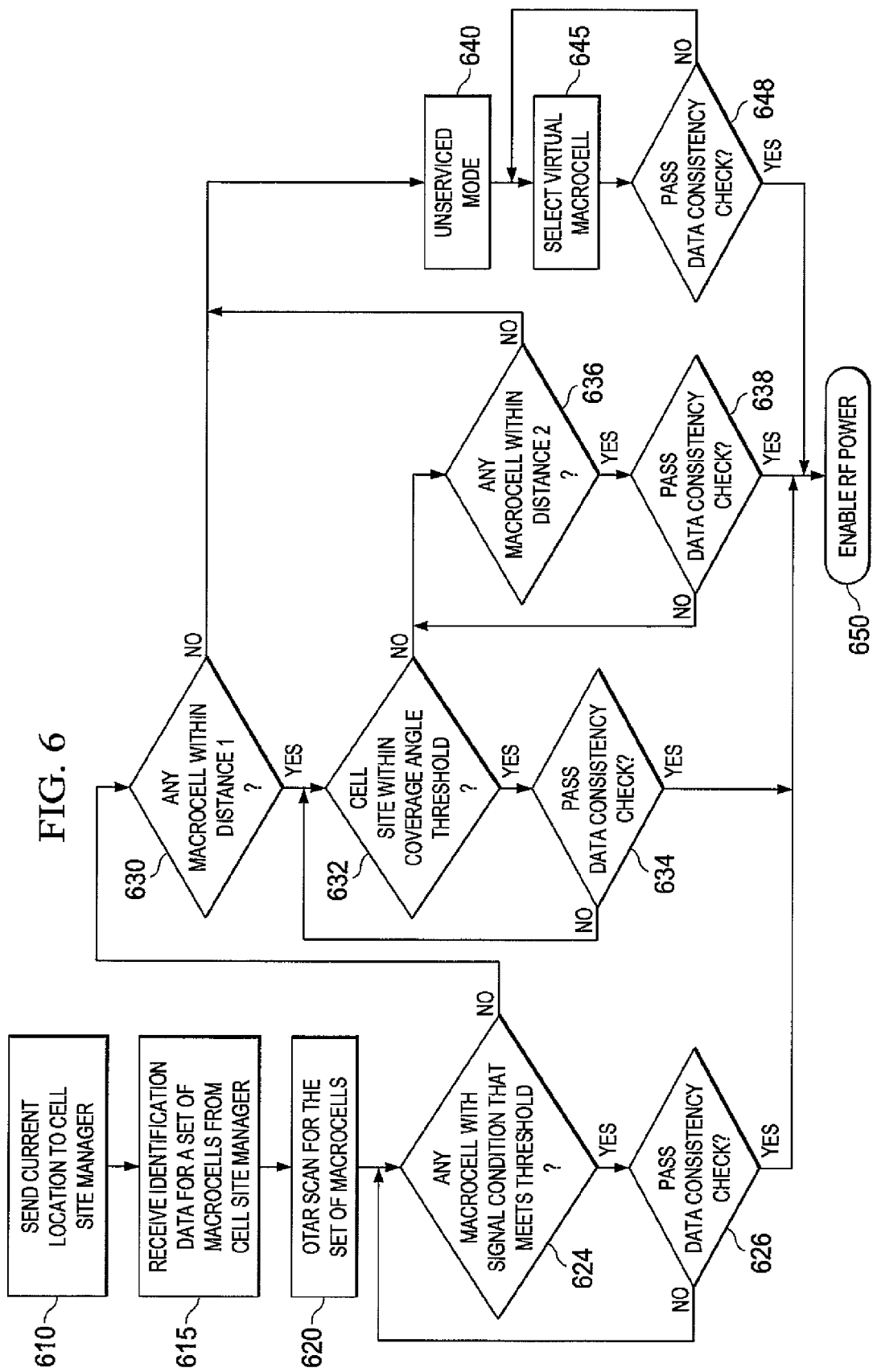
FIG. 6 illustrates a turn-up process using a selection algorithm to select the best macrocell according to an embodiment of the present disclosure.

FIG. 6 illustrates a turn-up process using a selection algorithm to select the best macrocell according to an embodiment of the present disclosure. The process illustrated in FIG. 6 will be described with respect to the network topology illustrated in FIG. 2 and in context with the call flow illustrated in FIG. 5. However, this process may be performed in any cell site (e.g. femtocell 160). In addition, the process illustrated in FIG. 6 assumes that the site has already powered on, completed authentication with the cell site manager (e.g. cell site manager 210), and determined its current location.

In block 610, the current location of the cell site (e.g. latitude/longitude position) is communicated to the cell site manager. The cell site manager queries the macrocell database and generates configuration data that includes, but is not limited to, a list of macrocells along with the respective cell site identification data. The list of macrocells includes existing macrocells and virtual macrocells (if virtual macrocells are defined). Upon receiving (or downloads) the configuration data from the cell site manager (in block 615), the cell site performs the Serving Macrocell Selection (SMCS) algorithm to determine the best macrocell from the list. The purpose of the SMCS algorithm is to select a macrocell that is best suitable for reusing the datafill information.

In block 620, the cell site may use the downloaded data or perform a wild scan of the RF environment to detect whether it is able to receive RF signal from the existing overlay macrocells. In an embodiment, the cell site has the ability to sense the environment and automatically find all the existing macrocells using an Over-The-Air Receiving (OTAR) Scan. OTAR is similar to what a mobile station (e.g. subscriber station) would do to sense the actual macro-RF conditions. As such, the cell site will scan the RF conditions for the existing macrocells in the list (received from the cell site manager). During the process, the cell site can measure RF conditions such as, but not limited to, signal density or signal-to-noise ratio (SNR).

In block 624, the cell site determines a set of candidate existing macrocells for which at least one RF condition meets a threshold that can be defined at manufacture or adjusted during deployment. In the event that the set of candidate macrocells includes more than one existing macrocell, the cell site communicates the cell site identification information of the existing macrocell with the strongest RF condition to the switching center (e.g. WSS 167).

The switching center is expected to validate the data to ensure that the candidate macrocell passes a data consistency check in block 626. If the data consistency check is successful, the switching center looks up the datafill information for the candidate macrocell and creates a datafill entry for the cell site by reusing the candidate macrocell's datafill information. The datafill information for all cell sites (e.g. existing macrocells, miniature cells, and virtual cells) can be stored in the switching center. The cell site then receives a positive acknowledgement from the switching center. Alternatively, if the data consistency check fails, the cell site receives a negative acknowledgement from the switching center, increments to the next strongest candidate macrocell, and returns to block 624.

If none of the detected macrocells can be used for datafill (i.e. none of the existing macrocell meets the RF condition threshold or none of the candidate macrocells passes the data consistency check), the cell site determines from the macrocell list whether any of the existing macrocells are within a first threshold distance (e.g. 25 km) from the cell site in block 630. The first threshold distance may be defined by the wireless operator. If none of the existing macrocells are within the first threshold distance, the cell site switches to the unserviced mode in block 640.

Otherwise, each existing macrocell located within the first threshold distance of the cell site is checked to determine whether the cell site is within its coverage angle in block 632. The existing macrocells within the first distance threshold of the cell site may be ordered from nearest to furthest prior to determining whether the cell site is within the coverage angle. In the event that the cell site is within the coverage angle for one or more existing macrocells located within the first threshold distance, the cell site identification for the nearest of these existing macrocells is communicated to the switching center as the candidate macrocell for data consistency check in block 634.

If the candidate macrocell passes, the switching center looks up the datafill information for the candidate macrocell and creates a datafill entry for the cell site by reusing the candidate macrocell's datafill information. The cell site then receives a positive acknowledgement from the switching center and enables the RF power in block 650. Otherwise, the cell site receives a negative acknowledgement from the switching center, increments to the next nearest candidate macrocell, and returns to block 632.

In some embodiments, if none of the nearest macrocells can be used for datafill (i.e. none of the existing macrocell meets coverage angle requirement or none of the candidate macrocells passes the data consistency check), the cell site determines from the macrocell list whether any of the existing macrocells are within a coverage angle bypass threshold (e.g. 5 km) from the cell site in block 636. The coverage angle bypass threshold is the second threshold distance and may be defined by the wireless operator. If none of the existing macrocells are within the second threshold distance, the cell site switches to the unserviced mode in block 640. Otherwise, each existing macrocell located within the second threshold distance of the cell site is ordered from nearest to furthest.

The cell site identification data for the nearest macrocell is communicated to the switching center as the candidate macrocell for data consistency check in block 638. If the candidate macrocell passes, the switching center looks up the datafill information for the candidate macrocell and creates a datafill entry for the cell site by reusing the candidate macrocell's datafill information. The cell site then receives a positive acknowledgement from the switching center and enables the RF power in block 650. Otherwise, the cell site receives a negative acknowledgement from the switching center, increments to the next nearest candidate macrocell, and returns to block 636.

If none of the nearest macrocells can be used for datafill (i.e. none of the existing macrocell meets the second distance threshold or none of the candidate macrocells passes the data consistency check), the cell site switches to the unserviced mode in block 640.

In block 640, the cell site determines that it is located in a locality or region that is currently unserviced by existing macrocells. That is, the cell site is located in the unserviced region of the wireless operator's coverage footprint. In some embodiments, virtual macrocells are defined for situations when a region is not currently serviced by an existing macrocell. Virtual macrocell data, as opposed to existing macrocell data, is not associated with a real macrocell that is actually deployed in the field for service. Virtual macrocells may be defined by county, city, neighborhood, zip code, and such. Virtual macrocells may be defined only for selected regions (e.g. unserviced counties) or all regions. Additionally, a default virtual macrocell may be defined.

If at least one virtual macrocell has been defined, the list of macrocells in the configuration data received from the cell site manager in block 615 will include all virtual macrocells that are applicable to current location of the cell site. Consequently, if at least one virtual macrocell is included in the macrocell list, the cell site will determine the best virtual macrocell in block 645 in response to switching to the unserviced mode.

The cell site identification data for the best virtual macrocell is communicated to the switching center to switching center as the candidate macrocell for data consistency check in block 648. If the candidate macrocell passes, the switching center looks up the datafill information for the candidate macrocell and creates a datafill entry for the cell site by reusing the virtual macrocell's datafill information. The cell site then receives a positive acknowledgement from the switching center and enables the RF power in block 650. Otherwise, the cell site receives a negative acknowledgement from the switching center, increments to the next best virtual macrocell, and returns to block 645.

In addition to enabling the RF power in block 650, the cell site transitions from OFFLINE status to ONLINE status and reports the status change to the cell site manager.

In an embodiment, the SMCS algorithm, as an option (not illustrated), may limit existing macrocells that are located in the same county as that of the cell site prior to performing block 624. This can be useful if there is any E911 PSAP restriction that requires datafilling to be conducted based on county coverage. If no existing macrocells are available in the county, then the cell site switch to the unserviced mode and select a virtual macrocell assigned within the same county. However, if no virtual macrocell is defined within the same county, existing macrocells from adjacent counties can be considered.

Figure 7:
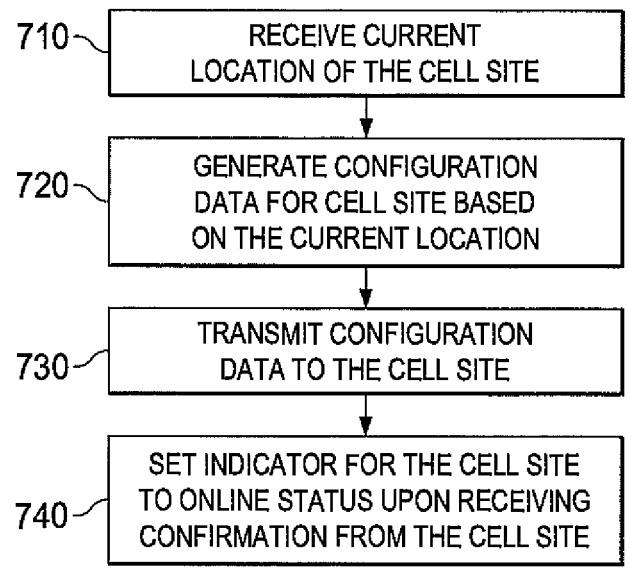
FIG. 7 illustrates a process for providing configuration data to a cell site during turn-up of the cell site according to an embodiment of the present disclosure.

FIG. 7 illustrates a process for providing configuration data to a cell site during turn-up of the cell site according to an embodiment of the present disclosure. The process illustrated in FIG. 7 may be performed in a cell site manager (e.g. cell site manager 210).

In block 710, the current location of the cell site (e.g. femtocell 160) is received. In block 720, configuration data is generated for the cell site based on the current location of the cell site. The configuration data may include, but is not limited to, a list of cell site identification data on macrocells. As mentioned earlier, the configuration data is generated by querying a database (e.g. macrocell database 220), and the list of macrocells can include existing macrocells and virtual macrocells. In block 730, the configuration data is transmitted to the cell site. Upon receiving confirmation from the cell site indicating that the cell site has received positive acknowledgement from the switching center (e.g. WSS 167) and enabled the RF power, the status indicator for the cell site is set to ONLINE status.

Figure 8:
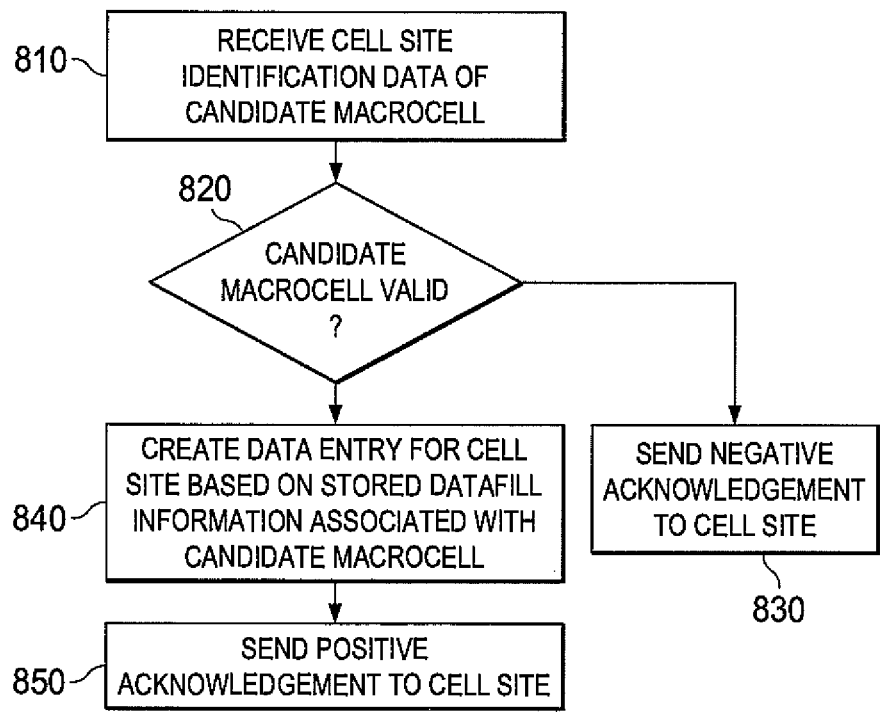
FIG. 8 illustrates a process for creating a datafill entry using stored datafill information of a valid macrocell according to an embodiment of the present disclosure.

FIG. 8 illustrates a process for creating a datafill entry using stored datafill information of a valid macrocell according to an embodiment of the present disclosure. The process illustrated in FIG. 8 may be performed in a switching center (e.g. WSS 167).

In block 810, the cell site identification data for a candidate macrocell is received from a cell site (e.g. femtocell 160). In block 820, a data consistency check is performed to determine whether the candidate macrocell is valid. If the data consistency check is unsuccessful, a negative acknowledgement is sent to the cell site in block 830.

Alternatively, if the consistency check is successful, a data entry for the cell site is created based on stored datafill information associated with the candidate macrocell in block 840. The datafill information associated with the candidate macrocell (and all valid macrocells) may be stored in the switching center. A positive acknowledgement is then sent to the cell site in block 850.

While the currently used method takes anywhere from several days to weeks to datafill a new cell site in the wireless switching center, the embodiments described in the present disclosure will reduce the total datafill time to a few seconds. Also, the embodiments disclosed will ensure the subscriber using the cell site will experience seamless services because the existing datafill information in the switching center is reused when turning up the cell site.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a cell site, a method to perform turn-up of the cell site in a wireless network, the method comprising:
    sending a current location of the cell site to a cell site manager;
    receiving cell site identification data for each of a set of macrocells from the cell site manager; and
    selecting a valid macrocell from the set of macrocells, the cell site identification data of the valid macrocell able to be used by a switching center to determine datafill information for the cell site, the datafill information used for completing integrity of data entered by a user based on the selected macrocell.

2. The method as set forth in claim 1, wherein the datafill information comprises at least one of market-specific translation data, dialup setup, emergency 911 (E911) Public Safety Answering Point (PSAP) route selection and configuration, and information for complying with telecommunications laws.

3. The method as set forth in claim 1, wherein selecting the valid macrocell comprises:
    determining a candidate macrocell from the set of macrocells based on at least one of a signal condition, distance, coverage angle, and an unserviced mode of operation;
    communicating the cell site identification data for the candidate macrocell to the switching center;
    repeating determining the candidate macrocell and communicating the cell site identification data for another candidate macrocell in response to receiving a negative acknowledgement of the candidate macrocell from the switching center; and
    selecting the candidate macrocell as the valid macrocell in response to receiving a positive acknowledgement of the candidate macrocell from the switching center.

4. The method as set forth in claim 3, wherein the set of macrocells comprises at least one of an existing macrocell that corresponds to a real macrocell site and a virtual macrocell that does not correspond to a real macrocell site, and
    wherein determining the candidate macrocell comprises:
        determining from the set of macrocells a first subset of existing macrocells from which a radio frequency (RF) signal detected at the cell site satisfies a condition; and
        selecting from the subset of existing macrocells a strongest macrocell when the first subset of existing macrocells comprises is not empty.

5. The method as set forth in claim 4, wherein determining the candidate macrocell further comprises:
    determining from the set of macrocells a second subset of existing macrocells that is located within a first distance from the cell site when the first subset of existing macrocells is empty;
    selecting from the second subset of existing macrocells a closest macrocell from the cell site for which the cell site is within a coverage angle of the closest macrocell; and
    selecting from the second subset of existing macrocells the closest macrocell that is located within a second distance from the cell site when the cell site is not within the coverage angle for any of the second subset of existing macrocells.

6. The method as set forth in claim 5, wherein the set of macrocells includes at least one virtual macrocell, and
    wherein determining the candidate macrocell further comprises:
        determining the cell site is in an unserviced mode of operation when none of the existing macrocells is selected; and
    selecting a best virtual macrocell as the candidate macrocell.

7. The method as set forth in claim 6, wherein the best virtual macrocell is one of a default virtual macrocell and a virtual macrocell assigned to a same locality as the cell site.

8. The method as set forth in claim 1, wherein the turn-up of the cell site is performed in one of a number of situations comprising power-up of a new cell site and moving of the cell site to a different location, and wherein the cell site is one of a group of miniature cell sites comprising microcells, picocells, femtocells, and cell site on wheels (COWs).

9. A cell site configured to perform turn-up in a wireless network, the cell site comprising:
    a global position positioning system (GPS) receiver configured to determine a current location of the cell site;
    a transceiver subsystem configured to manage a wireless communication interface; and
    a controller coupled to the GPS receiver and the transceiver subsystem, the controller configured to:
        send the current location of the cell site to a cell site manager,
        receive cell site identification data for each of a set of macrocells from the cell site manager,
        select a valid macrocell from the set of macrocells, the cell site identification data of the valid macrocell able to be used by a switching center to enter configuration data for the cell site, the configuration data used for completing integrity of data entered by a user based on the selected macrocell.

10. The cell site as set forth in claim 9, wherein, when selecting the valid macrocell, the controller is further configured to:
    determine a candidate macrocell from the set of macrocells and based on at least one of a signal condition, distance, coverage angle, and an unserviced mode of operation;
    communicate the cell site identification data for the candidate macrocell to the switching center;
    repeat determining the candidate macrocell and communicating the cell site identification data for another candidate macrocell in response to receiving a negative acknowledgement of the candidate macrocell from the switching center; and
    select the candidate macrocell as the valid macrocell in response to receiving a positive acknowledgement of the candidate macrocell from the switching center.

11. The cell site as set forth in claim 10, wherein the set of macrocells comprises at least one of an existing macrocell that corresponds to a real macrocell site and a virtual macrocell that does not correspond to a real macrocell site, and
wherein, when determining the candidate macrocell, the controller is further configured to:
determine from the set of macrocells a first subset of existing macrocells from which a radio frequency (RF) signal detected at the cell site satisfies a condition, and
select from the first subset of existing macrocells a strongest macrocell that is validated by the switching center when the first subset of existing macrocells comprises is not empty.

12. The cell site as set forth in claim 11, wherein when determining the candidate macrocell, the controller is further configured to:
determine from the set of macrocells a second subset of existing macrocells that is located within a first distance from the cell site when the first subset of existing macrocells is empty;
select from the second subset of existing macrocells a closest macrocell from the cell site for which the cell site is within a coverage angle of the closest macrocell; and
select from the second subset of existing macrocells the closest macrocell that is located within a second distance from the cell site when the cell site is not within the coverage angle for any of the second subset of existing macrocells.

13. The cell site as set forth in claim 12, wherein the set of macrocells includes at least one virtual macrocell, and
wherein, when determining the candidate macrocell, the controller is further configured to:
determine the cell site is in an unserviced mode of operation when none of the existing macrocells is selected; and
select a best virtual macrocell as the candidate macrocell.

14. The cell site as set forth in claim 13, wherein the best virtual macrocell is one of a default virtual macrocell and a virtual macrocell assigned to a same locality as the cell site.

15. The cell site as set forth in claim 9, wherein the cell site is configured to perform the turn-up in one of a number of situations comprising power-up of a new cell site and moving of the cell site to a different location, and wherein the cell site is one of a group of miniature cell sites comprising microcells, picocells, femtocells, and cell site on wheels (COWs).

16. For use in a cell site manager during a turn-up of a cell site, a method comprising:
receiving a current location of the cell site;
generating a configuration data for the cell site based on the current location of the cell site, the configuration data used for completing integrity of data entered by a user based on selected macrocell;
transmitting the configuration data to the cell site; and
setting an indicator for the cell site to an online status in response to receiving a confirmation of successful turn-up from the cell site.

17. The method as set forth in claim 16, wherein generating the configuration data for the cell site comprises:
querying a database for macrocells based on the current location of the cell site, the database comprising cell site identification data of all macrocells for all the markets served by an operator, each macrocell being one of an existing macrocell and a virtual macrocell; and
generating the configuration data based on query results, the configuration data comprising cell site identification data for each of macrocells in the query results.

18. The method as set forth in claim 17, wherein the query results comprise a set of existing macrocells that are located in a same geographic region as the cell site when virtual macrocells are defined, and
wherein the query results comprise a set of existing macrocells that are located in a same geographic region and at least one adjacent geographic region when virtual macrocells are not defined.

19. For use in a switching center during a turn-up of a cell site, the method comprising:
receiving cell site identification data of a candidate macrocell from the cell site;
determining whether a candidate macrocell is valid; and
creating at least one datafill entry for the cell site based on a stored datafill information associated with the candidate macrocell in response determining that the candidate macrocell is valid, the datafill information used for completing integrity of data entered by a user based on the candidate macrocell.

20. The method as set forth in claim 19, wherein the datafill information comprises at least one of market-specific translation data, dialup setup, emergency 911 (E911) Public Safety Answering Point (PSAP) route selection and configuration, and information for complying with telecommunications laws.

* * * * *